W. E. WINE.
FRICTION BUFFING DEVICE FOR RAILWAY CARS.
APPLICATION FILED APR. 3, 1916.
1,215,457. Patented Feb. 13, 1917.
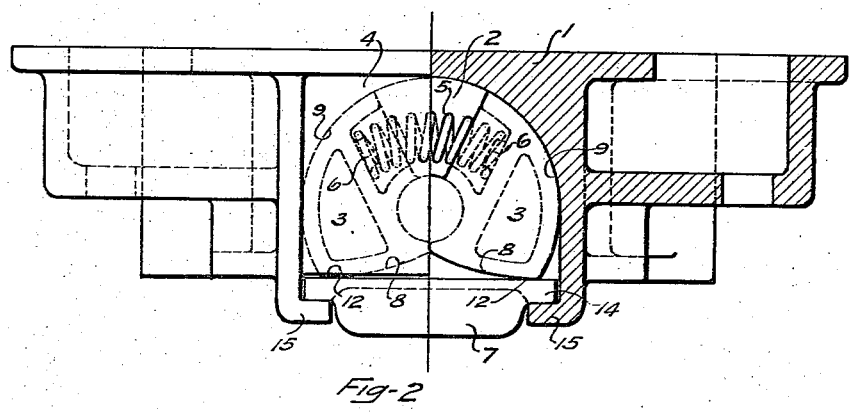
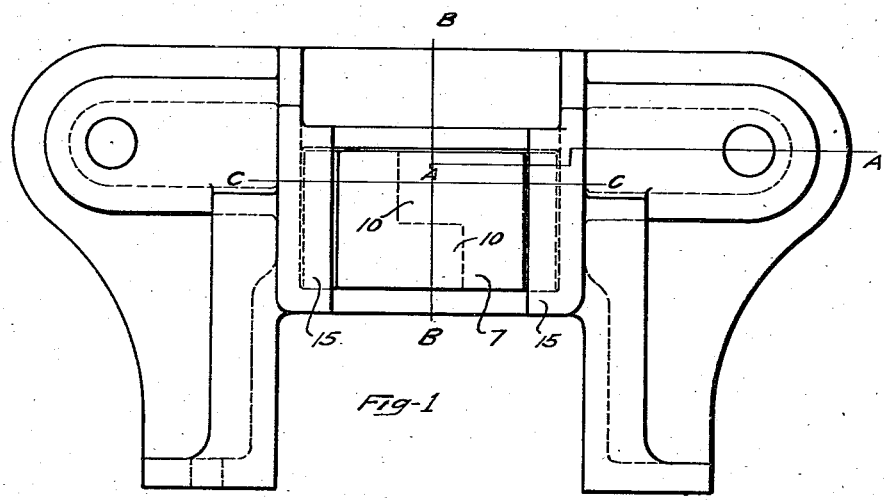
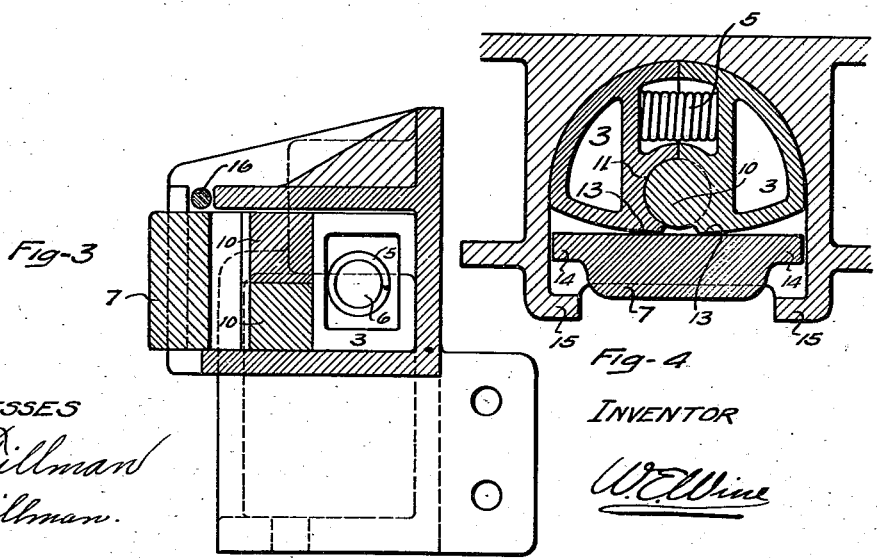

UNITED STATES PATENT OFFICE.

WILLIAM E. WINE, OF TOLEDO, OHIO.

FRICTION BUFFING DEVICE FOR RAILWAY-CARS.

1,215,457.   Specification of Letters Patent.   Patented Feb. 13, 1917.

Application filed April 3, 1916. Serial No. 88,623.

*To all whom it may concern:*

Be it known that I, WILLIAM E. WINE, a citizen of the United States, residing at Toledo, in the county of Lucas and the State of Ohio, have invented new and useful Improvements in Friction Buffing Devices for Railway-Cars, of which the following is a specification, reference being had to the accompanying drawings, forming a part hereof.

My invention relates to improvements in friction buffing devices intended for application to end sills of freight cars for supplementing the buffing action of the draft gear.

The object of my invention is to produce a strong and durable friction buffing device which is of compact construction and of few parts.

Another object of my invention is to construct the device so that it will be easily assembled and when assembled will be held together without any coöperating means with the car to which it may be applied.

With these and other objects hereinafter explained in view of my invention consists in the construction and combination of elements hereinafter described and claimed.

In the accompanying drawings which illustrate the preferred embodiment of my invention; Figure 1 is a front elevation of the device. Fig. 2 is a partial plan view and section on line A—A. Fig. 3 is a section on line B—B. Fig. 4 is a section on line C—C.

Similar characters designate similar parts throughout the several figures of the drawing.

Referring now to the parts by number; the housing 1 is of such form as to be readily applicable to the end sill of a car and is provided with a central chamber 2 in which is located the radial friction blocks 3 which contact with walls 4 of chamber 2. The release spring 5 has a bearing at each end around lugs 6 on the friction blocks 3 and holds friction blocks 3 in contact with buffer block 7. Friction blocks 3 are provided at their outer ends with a curved surface 8, which partly rolls on the innerside of buffer blocks 7 when it is moved in buffing, thus providing one of the friction elements of this device. The second friction element is provided by the large radial surface 9 sliding on wall 4 of the chamber 2 and the 3rd friction element is provided by the hinge like joint between the two friction blocks 3.

The friction blocks 3 are provided with bearings 10 which fit into corresponding sockets 11 of each respectively. The friction blocks 3 each being identical but reversed in their position.

It will be readily understood that in the operation of this device that the resistance offered thereby will gradually increase due to the changing point of contact between friction blocks 3 and buffer blocks 7.

During buffing, the strain is first transmitted from buffer block 7 to friction blocks 3 at points 12, which points have the greatest leverage against the friction along surfaces 9. Then the further friction block 7 moves the less this leverage becomes until the position of blocks 3 shown in Fig. 4 is reached with buffer block 7 contacting with friction blocks 3 at points 13.

The buffer block 7 holds the friction blocks 3 in position within chamber 2 by being provided with ends 14 engaging flanges 15. The friction block 7 is also held in engagement with flanges 15 by pin 16 extending laterally there above.

While this description is confined particularly to a buffing device to be applied to the end sills of cars, it is believed that the friction elements hereinafter described are applicable to any other form of buffing device and may also be applied to a draft gear inasmuch as the action of the friction elements would be identical to that just described.

Having thus described my invention, I aim in the appended claims to cover all modifications which do not involve a departure from its spirit and scope.

What I claim as new and desire to secure by Letters Patent of the United States is:—

1. In a buffing device for cars, the combination of a housing having a chamber therein and provided with a curved wall, a buffer member in said chamber adapted to be moved inwardly by a draw bar, a pivoted friction member slidably engaging said curved wall and adapted to coöperate with said buffer member and to be moved inwardly thereby, and a resilient means for opposing the movement of said friction member, the axis of the pivot of said friction member being substantially coincident with the axis of said curved wall.

2. In a buffing device for cars, the combination of a housing having a chamber therein and provided with a curved rear wall, a buffer member in said chamber adapted to be moved inwardly by a draw bar, a pivoted friction member having a sliding contact with said curved wall and provided with a curved front wall adapted to coöperate with said buffer member and to be moved inwardly thereby, and a spring for opposing the movement of said curved friction member, the axis of the pivot of said friction member being substantially coincident with the axis of said curved wall.

3. In a buffing device for cars, the combination of a housing having a chamber therein, said chamber being provided with a curved wall portion, a buffer member in said chamber adapted to be moved inwardly by a draw bar, and a pivoted friction member having a sliding engagement with the curved wall portion of said chamber, said friction member also having a varying contact with said buffer member and adapted to be moved inwardly thereby, and a resilient means for opposing the movement of said curved friction members, the axis of the pivot of said friction member being substantially coincident with the axis of said curved wall.

4. In a buffing device for cars, the combination of a housing having a chamber therein, and provided with a semi-circular rear wall, a buffer member in said chamber adapted to be moved inwardly by a draw bar, a pair of pivoted curved friction members slidably engaging said semi-circular rear wall and also adapted to coöperate with said buffer member and be moved inwardly thereby, and a resilient means for opposing the movement of said curved friction members, the axes of the pivots of said friction members being substantially coincident with the axis of said curved wall.

5. In a buffing device for cars, the combination of a housing having a chamber therein and provided with a semi-circular rear wall, a buffer member in said chamber adapted to be moved inwardly by a draw bar, a pivoted curved friction member having a sliding engagement with the semi-circular wall of said chamber, said curved friction member being also provided with curved front wall, which varyingly coöperates with said buffer member and a resilient means for opposing the movement of said friction member, the axis of the pivot of said friction member being substantially coincident with the axis of said curved wall.

6. In a buffing device for cars, the combination of a housing having a chamber therein and provided with a semi-circular rear wall, a buffer member in said chamber adapted to be moved inwardly by a draw bar, pivoted friction members slidably engaging said semi-circular rear wall and varyingly coöperating with said buffer member to be moved inwardly thereby, a resilient means for opposing the movement of said curved friction members, and means for retaining said buffer member in coöperative relation to said friction members, the axes of the pivots of said friction members being substantially coincident with the axis of said curved wall.

7. In a buffing device for cars, the combination of a housing having a chamber therein and provided with a semi-circular rear wall, a buffer member in said chamber adapted to be moved inwardly by a draw bar, and pivoted curved friction members varyingly coöperating with said buffer member to be moved inwardly thereby, said friction members being identical and oppositely arranged, and a resilient means for opposing the movement of said friction members, the axes of the pivots of said friction members being substantially coincident with the axis of said curved wall.

8. In a buffing device for cars, the combination of a housing having a chamber therein and provided with a semi-circular wall portion, a buffer member in said chamber adapted to be moved inwardly by a draw bar, and curved friction members slidably engaging said semi-circular wall and coöperating with said buffer member to be moved inwardly thereby, said curved friction members being identical and provided with engaging seats and bearings the axes of which coincide with the axis of said semi-circular wall and a resilient means for opposing the movement of said friction members.

9. In a buffing device for cars, the combination of a housing provided with a curved wall, a pivoted friction member coöperating with said curved wall and resilient means for opposing the movement of said friction member, the axis of the pivot of said friction member being substantially coincident with the axis of said curved wall.

This specification signed and witnessed this 1st day of April, 1916.

W. E. WINE.

In the presence of—
R. F. TILLMAN,
L. J. TILLMAN.